(12) United States Patent
Takasugi (10) Patent No.: US 8,764,576 B2
(45) Date of Patent: Jul. 1, 2014

(54) SWING ANALYSIS DEVICE, PROGRAM, AND SWING ANALYSIS METHOD

(75) Inventor: Toshiyasu Takasugi, Hadano (JP)

(73) Assignee: Seiko Epson Corporation (JP)

( * ) Notice: Subject to any disclaimer, the term of this patent is extended or adjusted under 35 U.S.C. 154(b) by 65 days.

(21) Appl. No.: 13/363,572

(22) Filed: Feb. 1, 2012

(65) Prior Publication Data

US 2012/0196693 A1 Aug. 2, 2012

(30) Foreign Application Priority Data

Feb. 2, 2011 (JP) ................................ 2011-021089

(51) Int. Cl.
*A63F 13/00* (2014.01)

(52) U.S. Cl.
USPC ............... 473/221; 473/219; 473/223; 463/3; 463/30

(58) Field of Classification Search
USPC .......................... 473/219, 221, 223; 463/3, 30
See application file for complete search history.

(56) References Cited

U.S. PATENT DOCUMENTS

| 5,904,484 | A | * | 5/1999 | Burns | ............................ | 434/252 |
| 5,907,819 | A | * | 5/1999 | Johnson | ......................... | 702/152 |
| 6,293,802 | B1 | * | 9/2001 | Ahlgren | ......................... | 434/252 |
| 7,074,168 | B1 | * | 7/2006 | Farnes et al. | ................... | 482/148 |
| 2006/0166737 | A1 | * | 7/2006 | Bentley | ............................ | 463/30 |

FOREIGN PATENT DOCUMENTS

| JP | 04-141186 | 5/1992 |
| JP | 2001-296799 | 10/2001 |
| JP | 2008-073210 | 4/2008 |
| JP | 2009-125507 | 6/2009 |
| JP | 2009-273551 | 11/2009 |

\* cited by examiner

*Primary Examiner* — James S McClellan (74) *Attorney, Agent, or Firm* — Harness, Dickey & Pierce, P.L.C.

(57) ABSTRACT

A swing analysis device includes a sensor section including a motion sensor adapted to detect a swing of sports equipment, a swing characteristic information calculation section adapted to calculate swing characteristic information of the swing based on output data of the motion sensor, the output data corresponding to the swing, a swing selection section adapted to select the swing characteristic information, and a reference swing characteristic information calculation section adapted to calculate reference swing characteristic information used as a reference based on the swing characteristic information selected, and store the reference swing characteristic information into a storage section.

8 Claims, 9 Drawing Sheets

| TIME INFORMATION (ELAPSED TIME) | ANGULAR VELOCITY SENSOR | | | ACCELERATION SENSOR | | |
| --- | --- | --- | --- | --- | --- | --- |
| | x | y | z | x | y | z |
| $t_1$ | $x_{\theta 1}$ | $y_{\theta 1}$ | $z_{\theta 1}$ | $x_{a1}$ | $y_{a1}$ | $z_{a1}$ |
| ⋮ | ⋮ | ⋮ | ⋮ | ⋮ | ⋮ | ⋮ |
| $t_n$ | $x_{\theta n}$ | $y_{\theta n}$ | $z_{\theta n}$ | $x_{an}$ | $y_{an}$ | $z_{an}$ |
| ⋮ | ⋮ | ⋮ | ⋮ | ⋮ | ⋮ | ⋮ |
| $t_{n+m}$ | $x_{\theta n+m}$ | $y_{\theta n+m}$ | $z_{\theta n+m}$ | $x_{an+m}$ | $y_{an+m}$ | $z_{an+m}$ |
| ⋮ | ⋮ | ⋮ | ⋮ | ⋮ | ⋮ | ⋮ |

FIG. 4

| SWING No. | DATA TYPE | TIME INFORMATION | GOOD FLAG |
|---|---|---|---|
| 000001 | 1 | t1~tn-1 | ON |
| 000002 | 1 | tn~tn+m-1 | OFF |
| 000003 | 1 | | ON |
| ... | ... | ... | ... |

430 — SWING No.  
440 — DATA TYPE  
450 — TIME INFORMATION  
460 — GOOD FLAG

| SWING No. 430 | DATA TYPE 440 | TIME INFORMATION 450 | SWING TRAJECTORY INFORMATION 470 | HEAD SPEED INFORMATION 480 |
|---|---|---|---|---|
| 000001 | 1 | t1 | S1 | H1 |
| 000002 | 1 | tn+m | S2 | H2 |
| ... | ... | ... | ... | ... |
| 000010 | 2 | tn+0 | S10 | H10 |
| ... | ... | ... | ... | ... |

SWING ANALYSIS DEVICE, PROGRAM, AND SWING ANALYSIS METHOD

BACKGROUND

1. Technical Field

The present invention relates to a swing analysis device, a program, and a swing analysis method.

2. Related Art

In a variety of fields, a device for analyzing a motion of a human or an object has been demanded. By analyzing, for example, the trajectory of a swing of a golf club to thereby make an improvement clear based on the analysis result, it is possible to achieve improvement in competition power.

At present, as a practical motion analysis device, there is commonly used a device of continuously shooting a measurement object provided with a mark using an infrared camera or the like, and then calculating the movement trajectory of the mark using the continuous image thus shot to thereby analyze the motion. JP-A-2001-296799 can be cited as an example.

However, in such a motion analysis device, there is a problem that since the infrared camera for shooting the image is required, the scale of the device grows, and therefore the device is difficult to handle. For example, in the case of attempting to take images of tennis exercise at a plurality of angles, it is required to move the position of the infrared camera or turn the player around in accordance with the angle to be shot.

Meanwhile, in recent years, there has been proposed a device of attaching a small motion sensor to the measurement object to thereby analyze the motion of the measurement object based on the output data of the sensor, which has an advantage that it is easy to handle because the infrared camera is not required, but is difficult to perform swing analysis meeting a need of the user.

It is important, but actually difficult, for the player of a game such as golf to keep the swing in the best condition, and therefore, the player wants to quantitatively know what happens in the present condition if the condition becomes worse than the best condition. Comparison with the best swing such as a swing of a top professional or an ideal swing based on the golf theory is sometimes performed. However, there is a problem that the actual best swing is different between the individual players, and is not universal.

SUMMARY

An advantage of some aspects of the invention is to provide a swing analysis device, a program, and a swing analysis method easy to handle and capable of providing swing analysis information based on the individual best swing.

(1) An aspect of the invention is directed to a swing analysis system including a sensor section including a motion sensor adapted to detect a swing of sports equipment, a swing characteristic information calculation section adapted to calculate swing characteristic information of the swing based on output data of the motion sensor, the output data corresponding to the swing, a swing selection section adapted to select the swing characteristic information, and a reference swing characteristic information calculation section adapted to calculate reference swing characteristic information used as a reference based on the swing characteristic information selected, and store the reference swing characteristic information into a storage section.

The sensor section may be configured by at least one of an acceleration sensor for detecting an acceleration of at least one axis (three axes may also be adopted) and an angular velocity sensor (a gyro sensor) for detecting an angular velocity of at least one axis (three axes may also be adopted), or may include a sensor functioning as a posture sensor.

The sports equipment may be, for example, a golf club, and the motion sensor may be configured to be attached to the golf club, and detect the swing of the golf club.

Since the output data of the motion sensor can be separated into for each swing by determining the feature before and after the swing based on the transition of the output data, the swing characteristic information of each swing may be calculated based on the output data for each swing.

The swing characteristic information may also be provided as the data for each of a plurality of items to be the materials for making a decision on how good the swing is or the condition of the swing.

The swing selection section may be a section for perform the selection based on an external input (e.g., an input by the user). For example, the output data of the swing, on which the user performs an input designating as "GOOD data (object of the selection)" may be selected from the operation section, as "GOOD data."

Further, the section for performing the selection based on the case in which the contents of the output data of the motion sensor fulfill a predetermined requirement may also be adopted. For example, the condition of the impact may be determined based on the output data of the motion sensor, and the output data of the swing with the impact condition fulfilling a predetermined requirement may be selected as the "GOOD data."

The reference swing characteristic information may be an average value of the swing characteristic information of the swings selected, the most frequent value, or other values.

The reference swing characteristic information calculation section may update the reference swing characteristic information in real time every time the swing characteristic information is newly selected.

The swing analysis system may be implemented as an integrated device having the sensor section configured integrally with the main body (the swing characteristic information calculation section, the swing selection section, and the reference swing characteristic information calculation section), or may have a configuration in which the sensor section is attached to the sports equipment or the like independently of the main body, and transmits the detection data to the main body in, for example, a wireless manner.

According to this aspect of the invention, there can be provided the swing analysis system and the method easy to handle and capable of providing the swing analysis information based on the individual best swing.

(2) The swing analysis system of the above aspect of the invention may further include a marking input section adapted to perform a marking input in association with the swing, and the swing selection section may select the swing characteristic information based on the marking input.

The information of presence or absence of the marking input may be held as a marking input flag in association with the output data of each swing, and then the swing selection section may select the swing characteristic information based on the marking input flag held in association with the output data of each swing.

(3) The swing analysis system of the above aspect of the invention may further include an impact condition determination section adapted to determine a condition of an impact in the swing based on the swing characteristic information, and the swing selection section may select the swing characteristic information based on a determination result of the condition of the impact in the swing.

The impact condition determination section may detect the impact timing in the swing of the sports equipment, calculate the variation in the posture angle of the sports equipment within a predetermined period of time from the impact timing, and determine the impact condition based on the calculation result. Further, the detection of the impact may be made such that the maximum value of the level of the angular velocity or the acceleration with respect to the axis of the swing of the sports equipment is detected based on the output data of the motion sensor, and the timing at which the level of the angular velocity or the acceleration with respect to the axis of the swing of the sports equipment is detected as the impact timing. In general, since it is conceivable that the angular velocity with respect to the axis of the swing of the sports equipment becomes the maximum immediately before the impact, the impact timing can be detected. Further, the determination of the impact condition may be made such that the criteria of the impact condition is variably set in accordance with the maximum value of the level of the angular velocity with respect to the axis of the swing of the sports equipment. In general, since it is conceivable that if the swing speed of the sports equipment is different, the level of the variation in the posture angle due to the rotational motion caused is different even if the ball hits the same position, by adopting the appropriate criteria corresponding to the swing speed, the impact condition can be determined without an error.

(4) The swing analysis system of the above aspect of the invention may further include a comparison section adapted to compare the swing characteristic information and the reference swing characteristic information with each other to generate comparison information, and an output section adapted to output the comparison information.

The best swing of the player, himself or herself and the present swing can easily be compared with each other, and by, for example, outputting the comparison data to an external viewer, it is possible to promptly inform the player of an improvement in the present swing.

(5) The swing analysis system of the above aspect of the invention may further include a data type input section adapted to input a data type of the swing.

In the case in which the content of the swing characteristic information to be calculated is different between the data types, the swing characteristic information calculation section may calculate the swing characteristic information corresponding to the data type of each swing.

Further, the comparison section may compare the swing characteristic information of each swing and the reference swing characteristic information having the same data type as that of the swing with each other.

(6) In the swing analysis system of the above aspect of the invention, the swing characteristic information calculation section may calculate data related to a swing trajectory of the swing as the swing characteristic information.

The data related to the swing trajectory may be, for example, coordinate values or a function representing the shape of the trajectory or the track of the sports equipment. For example, the initial state of the sports equipment may be obtained using the output value of the acceleration sensor, and then the subsequent motion may be obtained based on the output value of the angular velocity sensor (gyro sensor).

Further, the swing characteristic information calculation section may calculate the ground tilt angle value of the swing trajectory of the swing as the swing characteristic information based on the output data of the motion sensor.

(7) In the swing analysis system of the above aspect of the invention, the sensor section may include an acceleration sensor and an angular velocity sensor. The angular velocity sensor can be a gyro sensor.

(8) Another aspect of the invention is directed to a program for making a computer function as a device including a swing characteristic information calculation section adapted to calculate swing characteristic information of a swing of sports equipment based on output data of a motion sensor adapted to detect the swing, a swing selection section adapted to select the swing characteristic information, and a reference swing characteristic information calculation section adapted to calculate reference swing characteristic information used as a reference based on the swing characteristic information selected, and store the reference swing characteristic information into a storage section. According to this aspect of the invention, there can be provided a program used in the swing analysis system easy to handle and capable of providing the swing analysis information based on the individual best swing.

(9) Still another aspect of the invention is directed to a swing analysis method including: calculating swing characteristic information of a swing of sports equipment based on output data of a motion sensor adapted to detect the swing, selecting the swing characteristic information, and calculating reference swing characteristic information used as a reference based on the swing characteristic information selected, and storing the reference swing characteristic information into a storage section.

According to this aspect of the invention, there can be provided the swing analysis method easy to handle and capable of providing the swing analysis information based on the individual best swing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings. It should be noted that the embodiments described below do not unreasonably limit the content of the invention as set forth in the appended claims. Further, all of the constituents described below are not necessarily essential elements of the invention.

1. Configuration of Swing Analysis Device

Figure 1:
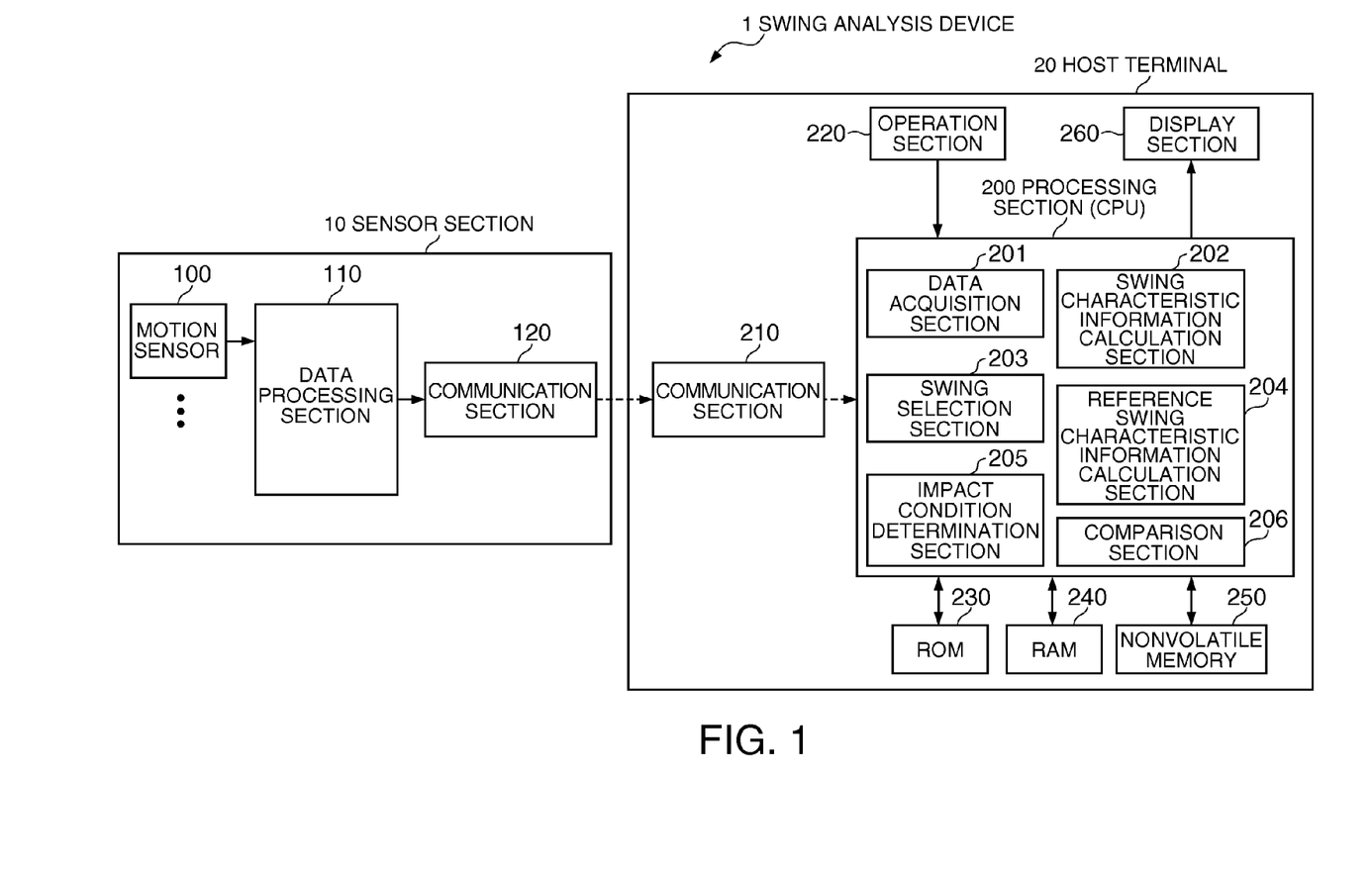
FIG. 1 is a diagram showing a configuration of a swing analysis device according to an embodiment of the invention.

FIG. 1 is a diagram showing a configuration of a swing analysis device according to an embodiment of the invention. The swing analysis device 1 according to the present embodiment is configured including a sensor section 10 including one or a plurality of motion sensors and a host terminal 20. The sensor section 10 and the host terminal 20 can be connected wirelessly or in a wired manner.

The sensor section 10 is attached to sports equipment to be an object of the swing analysis. In the present embodiment, the sensor section 10 is configured including one or a plurality of motion sensors 100, a data processing section 110, and a communication section 120.

The motion sensor 100 can include an angular velocity sensor (a gyro sensor). The angular velocity sensor detects the angular velocity around the detection axis, and outputs a signal (angular velocity data) corresponding to the level of the angular velocity detected. The swing analysis device 1 according to the present embodiment can include, for example, three angular velocity sensors for respectively detecting the angular velocities in the directions of three axes (x axis, y axis, and z axis) as the motion sensor 100 for the host terminal 20 to calculate the posture of the sports equipment.

Further, the motion sensor 100 can include an acceleration sensor. The acceleration sensor detects the acceleration in the detection axis, and outputs a signal (acceleration data) corresponding to the level of the acceleration detected. The swing analysis device 1 according to the present embodiment can include, for example, three acceleration sensors for respectively detecting the accelerations in the directions of the three axes (x axis, y axis, and z axis) as the motion sensor 100 for the host terminal 20 to calculate the posture of the sports equipment.

The data processing section 110 performs a process of outputting a packet formed by combining the output data of the motion sensor 100 with time information and so on to the communication section 120 in sync with the output data. Further, the data processing section 110 can be arranged to perform a process of bias correction or temperature correction of the motion sensor 100. It should be noted that the function of the bias correction or the temperature correction can be incorporated in the motion sensor 100.

The communication section 120 performs a process of transmitting the packet data, which is received from the data processing section 110, to the host terminal 20.

The host terminal 20 is configured including a processing section (CPU) 200, a communication section 210, an operation section 220, a ROM 230, a RAM 240, a nonvolatile memory 250, and a display section 260. The host terminal 20 can be realized as a dedicated device, or can be realized using a personal computer (PC), or a portable device such as a game machine, a cellular phone, or a smartphone.

The communication section 210 performs a process of receiving the data transmitted from the sensor section 10, and then transmitting it to the processing section 200.

The operation section 220 performs a process of obtaining operation data from the user, and then transmitting it to the processing section 200. The operation section 220 corresponds to, for example, a touch panel display, a button, a key, and a microphone.

Further, the operation section 220 can be made to function as a marking input section for performing marking input in association with the swing. Further, the operation section 220 can also be made to function as a data type input section for accepting an input regarding the data type of the swing.

The ROM 230 stores a program for the processing section 200 to perform a variety of calculation processes and control processes, various programs and data to realize application functions, and so on.

The RAM 240 is a storage section used as a working area of the processing section 200, and temporarily storing, for example, the program and data retrieved from the ROM 230, the data input from the operation section 220, and the calculation result obtained by the processing section 200 performing operations with the various programs.

The nonvolatile memory 250 is a recording section for recording the data required to be stored for a long period of time out of the data generated by the processing of the processing section 200. For example, it is possible to record the swing characteristic information of the swing selected and reference swing characteristic information.

The display section 260 is for displaying the processing result of the processing section 200 as letters, graphs, or other images. The display section 260 corresponds to, for example, a CRT, an LCD, a touch panel display, and a head-mount display (HMD). It should be noted that it is also possible to arrange that the functions of the operation section 220 and the display section 260 are realized by a single touch panel display.

The display section 260 can function as an output section for outputting comparison information.

The processing section 200 performs various calculation processes on the data received from the sensor section 10 via the communication section 210, and various control processes (e.g., display control on the display section 260) in accordance with the programs stored in the ROM 240.

In the present embodiment, the processing section 200 functions as a data acquisition section 201, a swing characteristic information calculation section 202, a swing selection section 203, a reference swing characteristic information calculation section 204, an impact condition determination section 205, and a comparison section 206 explained below. It should be noted that it is also possible for the processing section 200 of the present embodiment to have a configuration in which some of the functions are eliminated.

The data acquisition section 201 performs a process of acquiring the output data (the angular velocity data) of the sensor section 10, which is received via the communication section 210. The data thus acquired is stored in, for example, the RAM 240.

The swing characteristic information calculation section 202 calculates the swing characteristic information of the swing based on the output data of the motion sensor corresponding to the swing, the swing selection section 203 selects the swing characteristic information based on predetermined conditions, and the reference swing characteristic information calculation section 204 calculates the reference swing characteristic information as the swing characteristic information used as a reference based on the swing characteristic information of the swing thus selected, and then holds the reference swing characteristic information in a storage section.

Further, it is also possible for the swing selection section 203 to select the swing characteristic information based on the marking input performed in association with the swing.

Further, the impact condition determination section 205 determines the condition of the impact in the swing based on the output data of the motion sensor, and it is possible for the swing selection section 203 to select the swing characteristic information based on the determination result of the impact condition in the swing.

It is possible for the comparison section 206 to compare the swing characteristic information of the swing and the reference swing characteristic information with each other to thereby generate comparison information, and output it to the display section 260.

It is possible for the reference swing characteristic information calculation section 204 to calculate the reference swing characteristic information for each of the data types of the swing based on the swing characteristic information of the swing thus selected, and then store the reference swing characteristic information into the storage section (the RAM 240 or the nonvolatile memory 250).

The swing characteristic information calculation section 202 can calculate the data related to the swing trajectory of the swing based on the output data of the motion sensor as the characteristic information, or can calculate the data related to the angular velocity and the change in velocity of the swing in response to the impact based on the output data of the motion sensor as the characteristic information.

It should be noted that all or a part of the data acquisition section 201, the swing characteristic information calculation section 202, the swing selection section 203, the reference swing characteristic information calculation section 204, the impact condition determination section 205, and the comparison section 206 can be located in the sensor section 10.

Further, the host terminal 20 can be arranged to include sound output section or the like not shown, and can be made to function as an output section for outputting the comparison information by, for example, a voice message, sound effects, or music.

2. Specific Example of Swing Analysis Device

The case of analyzing a swing of a golf club will be explained as an example.

Figure 2:
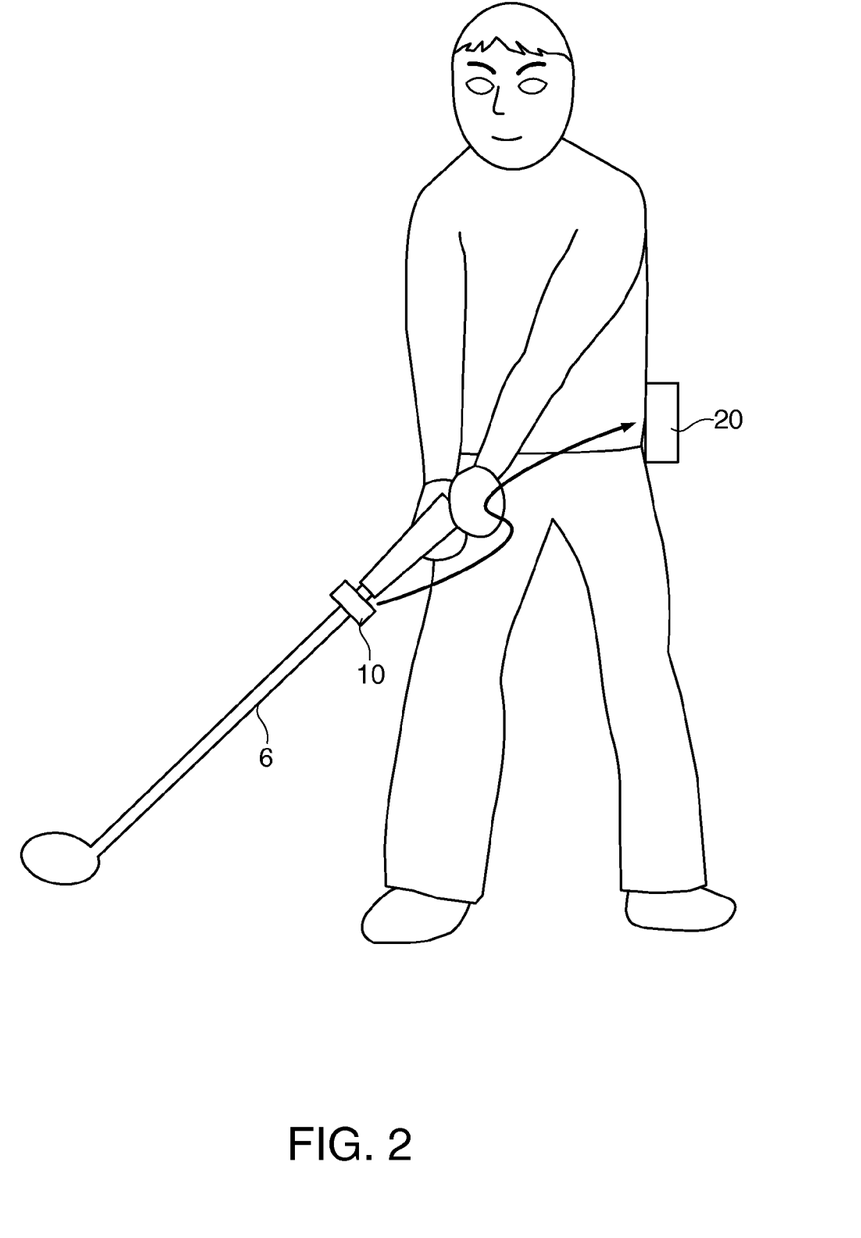
FIG. 2 is a diagram of a specific example of the swing analysis device according to the embodiment.

FIG. 2 is a diagram of a specific example of the swing analysis device according to the present embodiment.

As shown in the drawing, the sensor section 10 of the swing analysis device is attached to the golf club (an example of the sports equipment) 6 independently of the host terminal 20 as the main body, and transmits the detection data (the output data of the motion sensor) to the host terminal 20 in, for example, a wireless manner.

Figure 3:
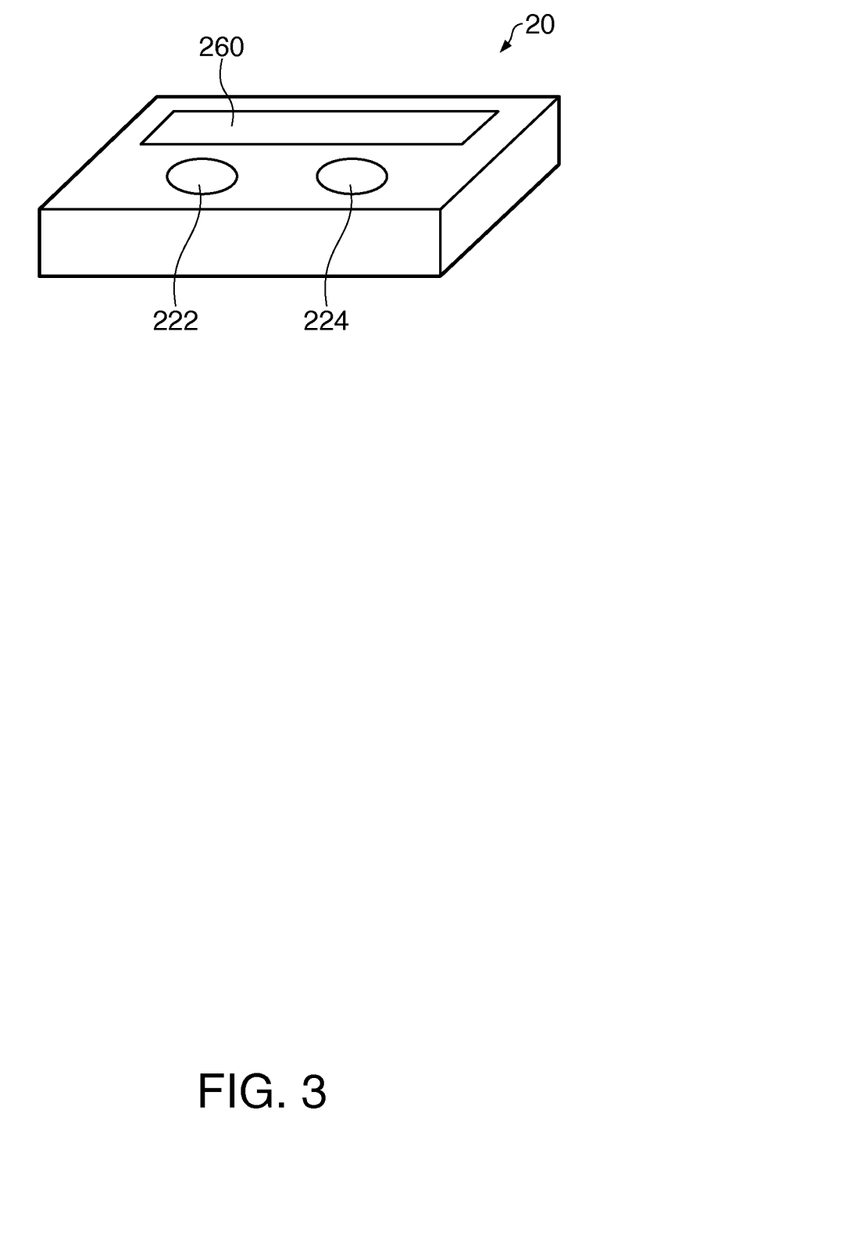
FIG. 3 is a diagram of an example of a host terminal as a main body.

FIG. 3 is a diagram of an example of the host terminal 20 as the main body.

The host terminal 20 has the operation section such as buttons 222, 224 and the display section 260 on the housing (external) thereof, and includes the CPU, the ROM, the RAM, the nonvolatile memory, and so on not shown in the inside thereof.

The button 222 can be arranged to be, for example, a button for performing a "GOOD" marking input. In the case in which the user makes a swing with the golf club and then believes that the swing made this time is a good swing, it is possible to perform "GOOD" marking on the output data related to the swing made this time in response to the button 222 being hold down (e.g., a "GOOD" flag or the like correlated with the output data can be set to ON). It should be noted that since in the case in which the swing is not believed to be a good swing, nothing is input, and the "GOOD" marking is not performed on the output data related to the swing with nothing input (e.g., the "GOOD" flag or the like correlated to the output data is set to OFF), the output data can be selected swing by swing based on the presence or absence (e.g., ON/OFF of the "GOOD" flag) of the marking.

The button 224 can be arranged to be, for example, a button for performing a club type (an example of the data type) input. It is also possible to arrange that when starting a swing exercise with the golf club, or when changing the type of the club used, the user holds down the button 224 to designate the type of the club. It is also possible to arrange that in the case, for example, in which the types of the club include club 1 (e.g., driver), club 2 (e.g., number n iron), and club 3 (e.g., putter), the club type is switched to club 1, club 2, club 3, . . . by pressing the button 224. It is also possible to arrange that when the button 224 is held down, the club type presently selected is displayed on the display section 260.

It is also possible to display the swing characteristic information of the swing made this time and the comparison information with the swing characteristic information (an example of the reference swing characteristic information) in the best mode on the display section 260 after the player makes the swing.

The comparison information can be comparison result data, the determination result (e.g., a rank provided in accordance with how good the swing is) of the determination on performance of the swing performed based on the comparison result, analysis contents of the analysis performed on the swing based on the comparison result, or a message (e.g., a message such as "almost," "put in more effort," or "excellent") to the user created based on the comparison result.

It should be noted that the comparison and the output of the comparison information can be performed on every output data of the swing, or can be performed only on the output data of the swing on which the marking is not performed.

Further, it is also possible to provide a sound output section such as a speaker to the host terminal 20 to thereby output the comparison result using a sound, a voice message, music, and so on.

3. Output Data of Motion Sensor and Swing Information

Figure 4:
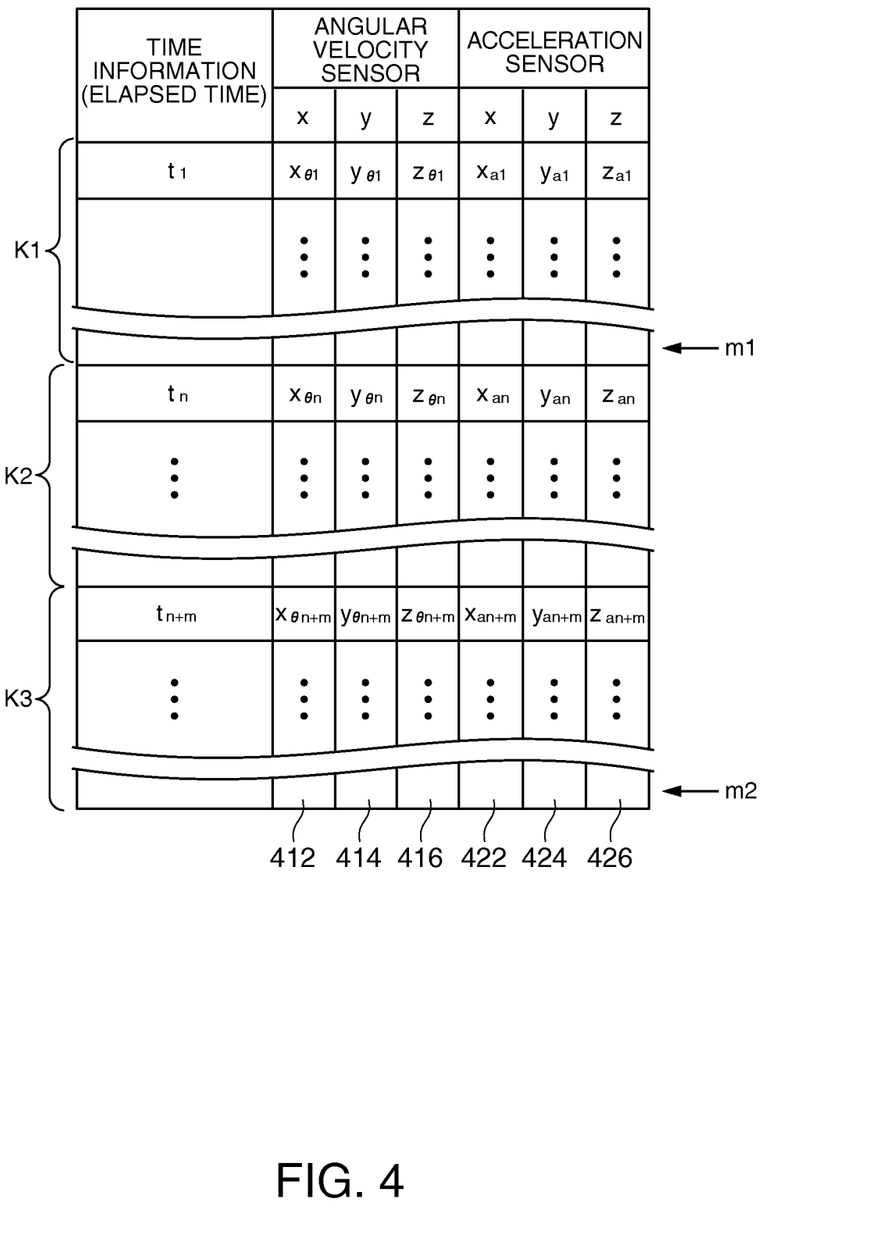
FIG. 4 is a diagram of an example of output data of a motion sensor.

FIG. 4 is a diagram showing an example of the output data of the motion sensor.

Here, the case in which the motion sensor is composed of a triaxial angular velocity sensor (x, y, z) and a triaxial acceleration sensor will be explained as an example.

The output data of the motion sensor is composed of detection values 412, 414, and 416 of the triaxial angular velocity sensor (x, y, z) and the detection values 422, 424, and 426 of the triaxial acceleration sensor (x, y, z) with predetermined time intervals (t1, t2, . . . , tn, . . . ) obtained by converting the analog signals output by the triaxial angular velocity sensor (x, y, z) and the triaxial acceleration sensor into digital signals.

It is possible to determine the features before and after the swing based on, for example, the transitions in the output data 412, 414, 416, 422, 424, and 426 to thereby delimit the output data by swing (including a single swing and non-swing periods before and after the swing, alternatively a period from the start of the swing to the time point before the start of the subsequent swing). For example, if it is determined that interval K1 (time t1 through time tn−1), interval K2 (time tn through time tn+m−1), . . . each show the feature of the output data corresponding to a single swing, the output data of each of the intervals K1, K2, . . . is recognized as the output data corresponding to a single swing, and the calculation of the swing characteristic information of each swing is performed.

If "GOOD marking" input is present in the operation section (e.g., the button 224 shown in FIG. 3), it is possible to correlate the marking input with the output data of each swing based on the timing of each swing and the timing of the marking input.

For example, if the "GOOD marking" inputs m1, m2 are present in the operation section (e.g., the button 224 shown in FIG. 3) in the periods of the respective intervals K1, K3, the output data of the swing in each of the intervals K1, K3 is marked as "GOOD" data.

It should be noted that it is also possible to provide a marking input period for determining the end of each swing based on the output data, and performing the marking input to each swing in the end of each swing. If the marking input is performed during the marking input period, the output data of the swing corresponding to the marking input period is marked as "GOOD" data.

Figure 5:
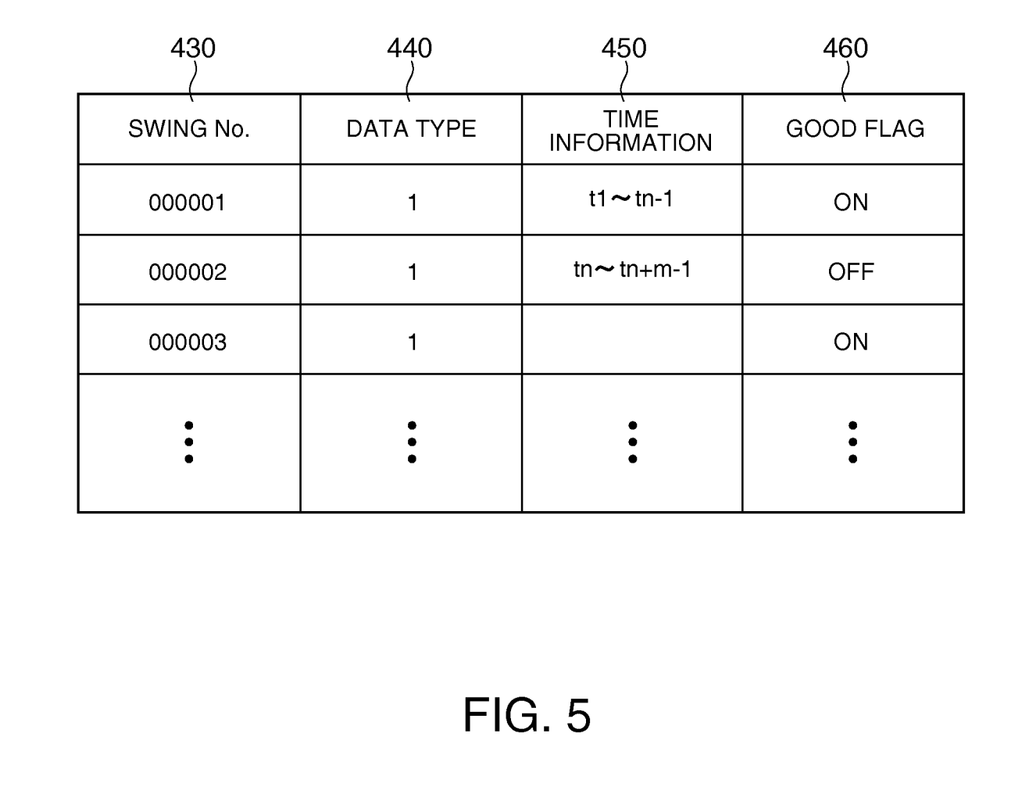
FIG. 5 is a diagram of an example of swing information.

FIG. 5 shows an example of the swing information stored in association with the output data of the motion sensor.

It is also possible to delimit the output data of the motion sensor swing by swing, expediently provide a swing number 430 to each swing, and store the swing information such as the data type 440, the time information 450, and the GOOD flag 460 in association with the swing number 430.

The time information 450 is the time information (the start time and the end time of each interval) of the interval corresponding to each swing. The swing portion can be identified from the output data of the motion sensor based on the time information 450. Further, it is also possible to store the GOOD flag 460 in association with the swing number 430. It is also possible to take out the corresponding output data of the motion sensor based on the time information 450 of each swing, and to calculate the swing characteristic information. Further, it is also possible to determine whether or not each swing is selected based on the GOOD flag information 460 of each swing.

Figure 6:
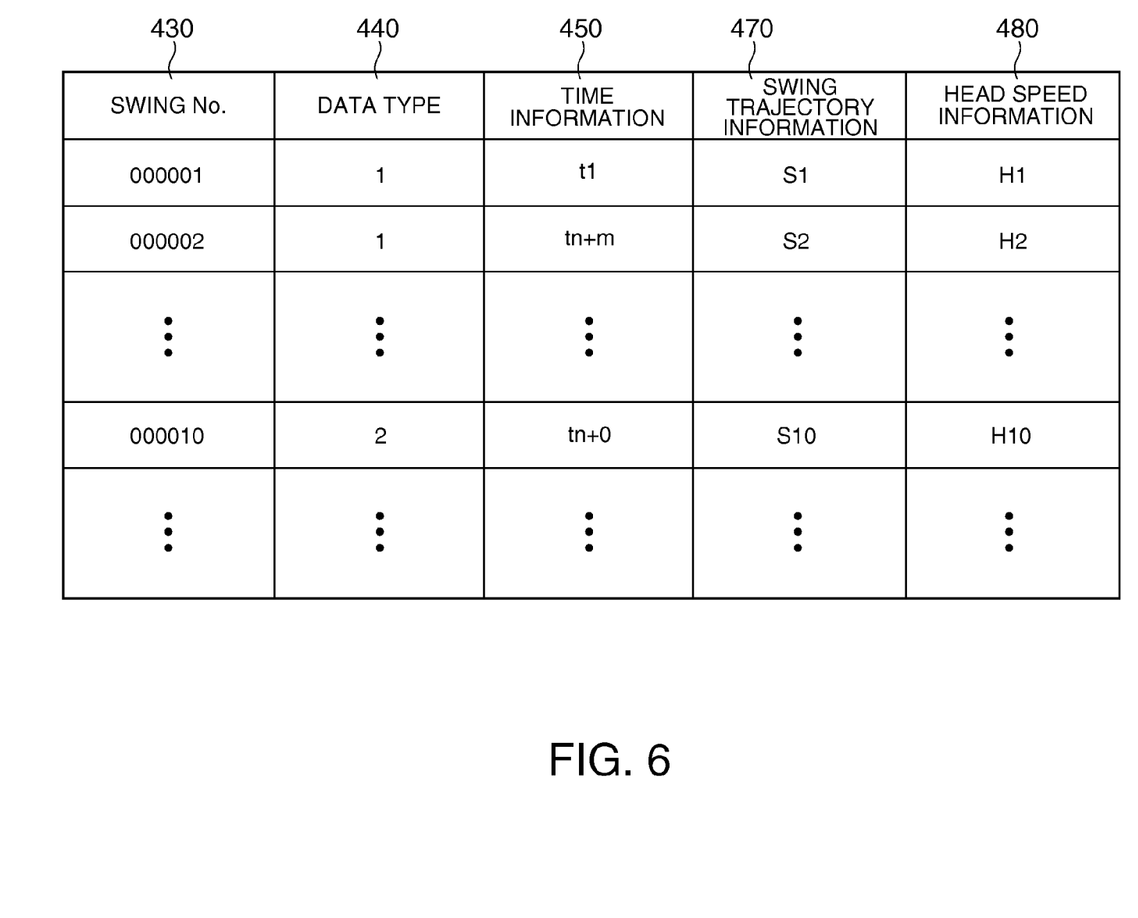
FIG. 6 is a diagram of an example of swing characteristic information.

4. Swing Characteristic Information and Best Mode Swing Characteristic Information FIG. 6 shows an example of the swing characteristic information.

The swing characteristic information includes swing trajectory information 470 and head speed information 480, and is calculated based on a corresponding part of the output data of the motion sensor to the swing, and stored in association with the swing number 430. It should be noted that it is also possible to arrange that the data type 440 is also stored in association with the swing number 430 to thereby provide correspondence between the swing characteristic information and the data type.

The swing trajectory information 470 can be, for example, coordinate values or a function representing the shape of the trajectory or the track of the sports equipment. It is also possible to obtain, for example, the initial state of the sports equipment using the output value of the acceleration sensor, and then obtain the subsequent motion with the output value of the angular velocity sensor (gyro sensor).

Further, as the swing trajectory information 470, the ground tilt angle value of the swing trajectory obtained based on the output data of the motion sensor can also be included.

Further, the head speed information 480 can be an angular velocity upon impact. The angular velocity upon impact can be an angular velocity in the swing plane, and can be obtained by correcting the actual output of the angular velocity sensor in accordance with the posture of the golf club or the like.

The best mode swing characteristic information (an example of the reference swing characteristic information) is calculated based on the swing characteristic information of the swing stored as the GOOD data. In the case, for example, in which there exists a plurality of types of swing characteristic information, namely the swing trajectory information 470 and the head speed information 480, as shown in FIG. 6, it is also possible to obtain the best mode information (best mode swing trajectory information and best mode head speed information) for the respective types of swing characteristic information.

As the calculation process of the best mode swing characteristic information, it is possible to calculate the average value of the swing characteristic information of the swings stored as the GOOD data, and then use the average value thus obtained as the best mode swing characteristic information. Further, it is also possible to calculate the most frequent value of the swing characteristic information of the swing stored as the GOOD data, and to use the most frequent value thus obtained as the best mode swing characteristic information.

Further, the best mode swing characteristic information can also be obtained for each of the data types. It is also possible to calculate, for example, the best mode swing trajectory information of the data type "1" based on the swing trajectory information S1, S2, . . . of the swings "000001," "000002," . . . of the data type "1."

Further, the update of the best mode swing characteristic information can also be performed in real time. Since the number of the samples of the population to be the base of the best mode swing characteristic information calculation increases every time the GOOD swing occurs when the user makes a swing, it is also possible to update the best mode swing characteristic information every time the number of the samples is incremented.

5. Impact Determination Process

Figure 9A:
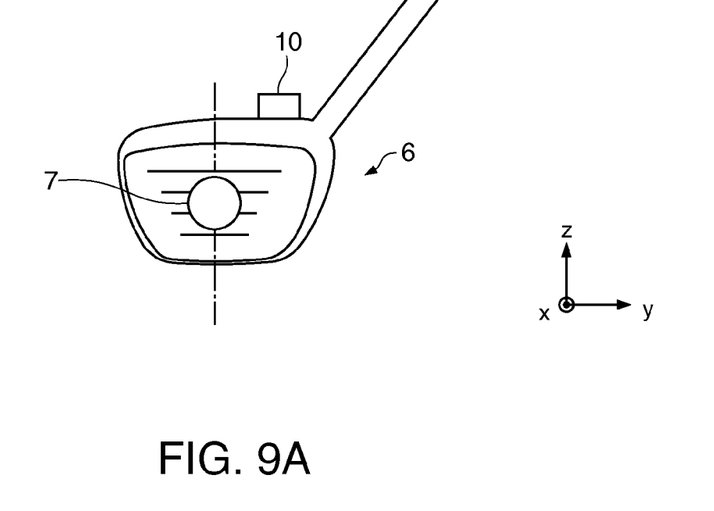
FIGS. 9A and 9B are diagrams showing an example of determining an impact condition in a swing of a golf club.
Figure 9B:
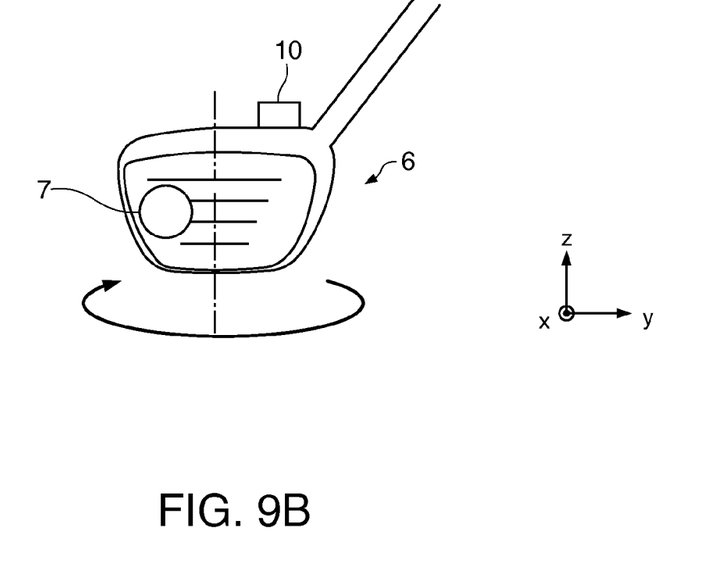

FIGS. 9A and 9B are diagrams of an example of determining the impact condition in the swing of the golf club. For example, FIG. 9A shows a diagram of the head of the golf club 6 hit by a golf ball 7 at a position on the central axis (indicated by the dashed-dotted line) thereof in the swing of the golf club 6. In contrast, FIG. 9B shows a diagram of the head of the golf club 6 hit by the golf ball 7 at a position shifted leftward from the central axis (indicated by the dashed-dotted line) thereof in the swing of the golf club 6. If the golf ball 7 hits the head of the golf club 6 at the position on the central axis (if the head hits the golf ball squarely), the rotation around the central axis hardly occurs. However, if the golf ball 7 hits it at the position shifted from the central axis (if the head fails to meet the golf ball), the rotation (the arrow in FIG. 9B) around the central axis occurs immediately after the impact. Therefore, taking an arbitrary axis perpendicular to the central axis of the head of the golf club 6 as a determination axis, it is possible to determine whether or not the golf ball 7 hits the head on the central axis based on the variation in the posture angle of the determination axis immediately after the impact. Further, the timing of the impact can be determined based on the angular velocity around the swing axis.

Therefore, in order to capture the angular velocity around the swing axis and the angular velocity around the determination axis, the sensor section 10 including three angular velocity sensors capable of respectively detecting the angular velocities in the directions of the three axes (the x axis, the y axis, and the z axis) perpendicular to each other, for example, is attached to the head of the golf club 6 so that, for example, the x axis is perpendicular to the hitting plane, and the z axis coincides with the central axis of the head of the golf club 6. Thus, the impact timing can be detected based on the angular velocity data around the y axis (the swing axis), and at the same time, the condition of the impact can be determined based on the variation in the posture angle of the x axis or the y axis (the determination axis) immediately after the impact. It should be noted that the sensor section 10 can be attached not only to the head of the golf club 6 but also to an arbitrary position where the sensor section 10 poses no problem for the swing.

By calculating the maximum variation in the posture angle of the determination axis in a predetermined period of time immediately after the impact as described above, the rotational motion of the sports equipment caused by the impact can be captured. Therefore, by appropriately selecting the determination axis in accordance with the sports equipment, the impact condition can be determined objectively.

6. Processing of the Present Embodiment

Figure 7:
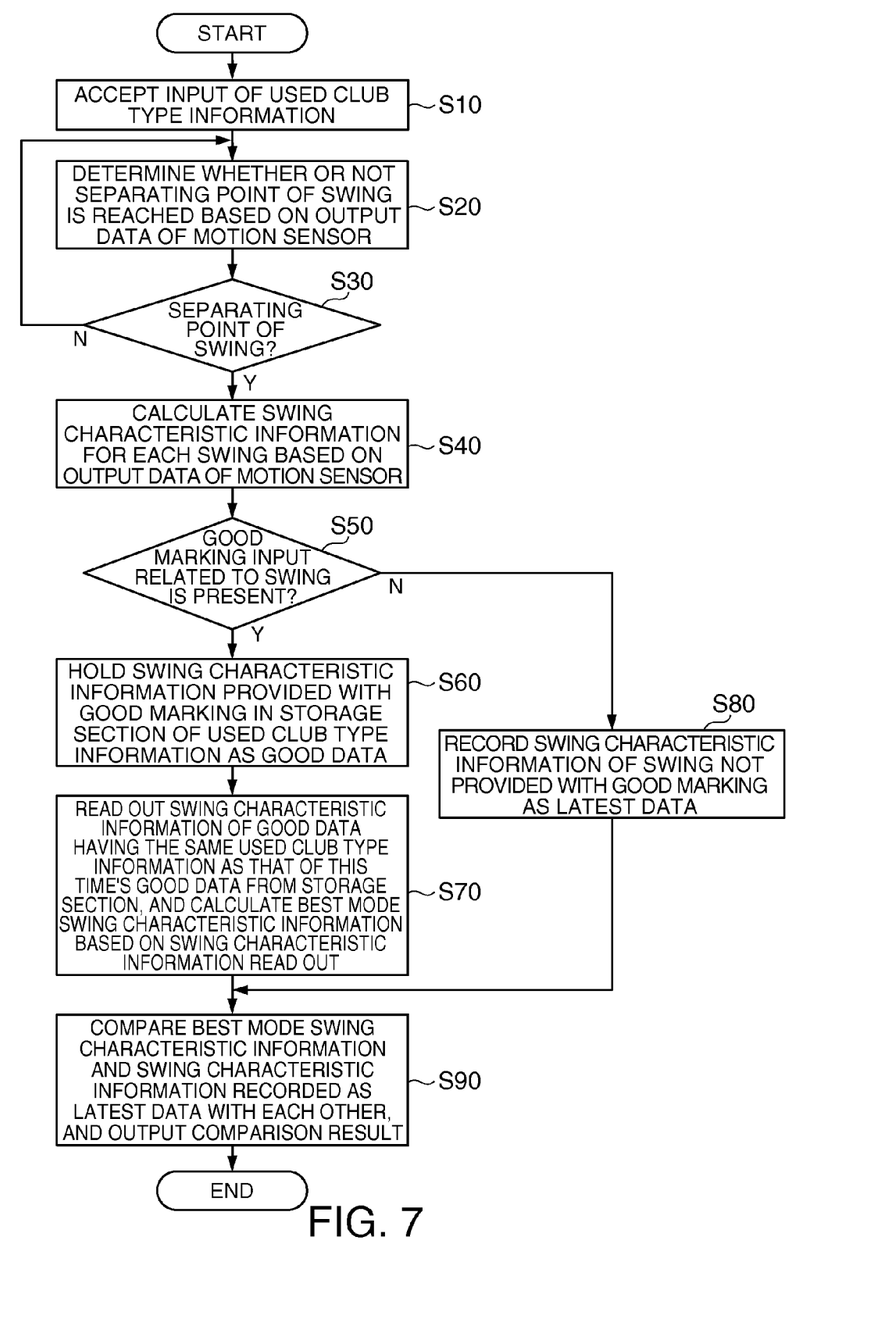
FIG. 7 is a flowchart showing a flow of a process in the case of selecting GOOD data by a marking input from an input section.

FIG. 7 is a flowchart showing a flow of a process in the case of selecting GOOD data by the marking input from the input section.

When the player switches the power of the present system ON, the following process is performed.

Firstly, the input of used club type information as the type of the golf club to be used is accepted (step S10). It should be noted that it is possible to perform the subsequent process using a default value or the latest designated value if no particular input occurs.

Whether or not the separating point between the swings is reached is determined (step S20) based on the output data of the motion sensor. The output data of the motion sensor shown in, for example, FIG. 4 is separated into the interval K1, the interval K2, . . . , and the timing at which the interval is switched to the subsequent interval is determined as the separating point of the swing.

If the separating point of the swing is reached (step S30), the subsequent process is performed, and if the separating point is not reached, the process returns to the step S20.

The swing characteristic information is calculated (step S40) for each swing based on the output data of the motion sensor. The characteristic information such as the swing trajectory information and the head speed information is calculated.

Subsequently, whether or not the GOOD marking input related to the swing is present is determined. If the GOOD marking input is present in the operation section, the GOOD marking is recorded as the swing data (the GOOD flag) of the swing designated as "GOOD." It is also possible to determine the presence or absence of the GOOD marking input related to the swing based on the swing data (the GOOD flag) of the swing.

If the GOOD marking input related to the swing is present (step S50), the swing characteristic information provided with the GOOD marking is held (step S60) in the storage section of the used club type information as the GOOD data.

The swing characteristic information of the GOOD data (including this time's GOOD data) having the same used club type information as this time's GOOD data is read out from the storage section, and then the best mode swing characteristic information (an example of the reference swing characteristic information) is calculated (step S70) based on the swing characteristic information thus read out.

If no GOOD marking is present in the operation section, the swing characteristic information of the swing not provided with the GOOD marking is recorded (step S80) as the latest data.

Subsequently, the best mode swing characteristic information and the swing characteristic information recorded as the latest data are compared with each other, and the comparison result is output (step S90).

As described above, according to the swing analysis device of the present embodiment, the GOOD swing is selected in accordance with the GOOD marking input by the user, the best mode swing characteristic information is calculated based on the GOOD data of the GOOD swing, and then the analysis of the swing is performed based on the best mode swing characteristic information. Therefore, there can be provided the swing analysis device capable of providing the swing analysis information based on the individual best swing of the user in real time.

Figure 8:
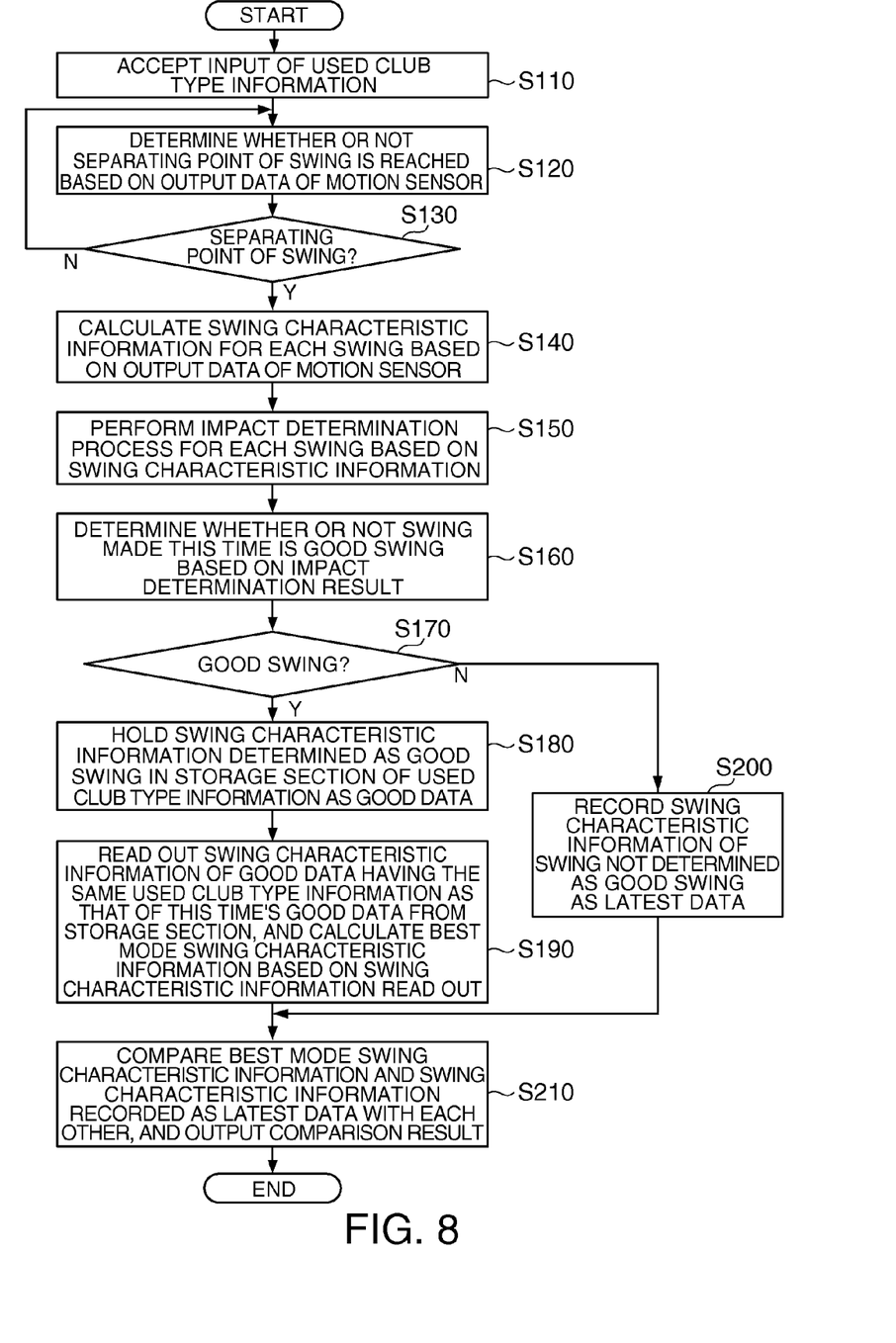
FIG. 8 is a flowchart showing a flow of a process in the case of performing an impact determination on output data of a motion sensor to thereby select the GOOD data.

FIG. 8 is a flowchart showing a flow of the process in the case of performing the impact determination on the output data of the motion sensor to thereby select the GOOD data.

Firstly, the input of the used club type information as the type of the golf club to be used is accepted (step S110). It should be noted that it is possible to perform the subsequent process using a default value or the latest designated value if no particular input occurs.

Whether or not the separating point between the swings is reached is determined (step S120) based on the output data of the motion sensor. The output data of the motion sensor shown in, for example, FIG. 4 is separated into the interval K1, the interval K2, . . . , and the timing at which the interval is switched to the subsequent interval is determined as the separating point of the swing.

If the separating point of the swing is reached (step S130), the subsequent process is performed, and if the separating point is not reached, the process returns to the step S120.

The swing characteristic information is calculated (step S140) for each swing based on the output data of the motion sensor. The characteristic information such as the swing trajectory information and the head speed information is calculated.

Subsequently, the impact determination process is performed (step S150) for each swing based on the swing characteristic information.

Subsequently, based on the impact determination result, whether or not the swing made this time is the GOOD swing is determined (step S160). It is also possible that the condition of the impact is determined based on the output data of the motion sensor, and if the impact condition fulfills a predetermined requirement, it is recorded as the swing data (the GOOD flag) of the swing designated as "GOOD," and whether or not the swing is the GOOD swing is determined based on the swing data (the GOOD flag) of the swing.

If it is determined to be the GOOD swing (step S170), the swing characteristic information of the swing determined to be the GOOD swing is held (step S180) in the storage section of the used club type information as the GOOD data.

The swing characteristic information of the GOOD data (including this time's GOOD data) having the same used club type information as this time's GOOD data is read out from the storage section, and then the best mode swing characteristic information (an example of the reference swing characteristic information) is calculated (step S190) based on the swing characteristic information thus read out.

If it is not determined to be the GOOD swing, the swing characteristic information of the swing which is not determined to be the GOOD swing is recorded (step S200) as the latest data.

Subsequently, the best mode swing characteristic information and the swing characteristic information recorded as the latest data are compared with each other, and the comparison result is output (step S210).

As described above, according to the swing analysis device of the present embodiment, the GOOD swing is selected in accordance with the impact determination result of the output data of the motion sensor, the best mode swing characteristic information is calculated based on the GOOD data of the GOOD swing, and then the analysis of the swing is performed based on the best mode swing characteristic information.

Therefore, there can be provided the swing analysis device capable of providing the swing analysis information based on the individual best swing of the user in real time.

Although the method of the present embodiment is hereinabove explained citing the case in which the sports equipment is the golf club as an example, the method of the present embodiment can be applied to other sports equipment by appropriately defining the swing axis and the determination axis in accordance with the sports equipment.

The invention is not limited to the embodiments described above, but can be put into practice with various modifications within the scope or the spirit of the invention.

The invention includes configurations (e.g., configurations having the same function, the same way, and the same result, or configurations having the same object and the same advantages) substantially the same as those described in the embodiment section. Further, the invention includes configurations obtained by replacing a non-essential part of the configurations described in the embodiment section. Further, the invention includes configurations exerting the same advantages or configurations capable of achieving the same object as the configurations described in the embodiment section. Further, the invention includes configurations obtained by adding technologies known to the public to the configurations described in the embodiment section.

The entire disclosure of Japanese Patent Application No. 2011-021089, filed Feb. 2, 2011 is expressly incorporated by reference herein.

What is claimed is:

1. A swing analysis system comprising:
   a sensor section including a motion sensor adapted to detect a swing of sports equipment;
   a swing characteristic information calculation section adapted to calculate swing characteristic information of the swing based on output data of the motion sensor, the output data corresponding to the swing;
   a swing selection section adapted to select and store the swing characteristic information of the swing calculated by the swing characteristic information calculation section as a reference swing when a predetermined condition is met;
   a reference swing characteristic information calculation section adapted to calculate a primary reference swing having reference swing characteristic information wherein the reference swing characteristic information is calculated using a plurality of the swing characteristic information from a plurality of the reference swings selected by the swing selection section, and the reference swing characteristic information calculation section stores the reference swing characteristic information of the primary reference swing in a storage section;
   a comparison section adapted to compare the swing characteristic information calculated by the swing characteristic information calculation section with the reference swing characteristic information of the primary reference swing calculated by the reference swing characteristic information calculation section and to generate comparison information; and
   an output section adapted to output the comparison information.

2. The swing analysis system according to claim 1 further comprising:
   a marking input section adapted to perform a marking input in association with the swing,
   wherein the swing selection section selects the swing characteristic information based on the marking input.

3. The swing analysis system according to claim 1 further comprising:
   an impact condition determination section adapted to determine a condition of an impact in the swing based on the swing characteristic information,
   wherein the swing selection section selects the swing characteristic information based on a determination result of the condition of the impact in the swing.

4. The swing analysis system according to claim 1 further comprising:
   a data type input section adapted to input a data type of the swing.

5. The swing analysis system according to claim 1 wherein the swing characteristic information calculation section calculates data related to a swing trajectory of the swing as the swing characteristic information.

6. The swing analysis system according to claim 1 wherein the sensor section includes an acceleration sensor and an angular velocity sensor.

7. A program stored on a non-transitory computer readable storage medium for a computer comprising:
   a swing characteristic information calculation section adapted to calculate swing characteristic information of a swing of sports equipment based on output data of a motion sensor adapted to detect the swing;
   a swing selection section adapted to select and store the swing characteristic information of the swing as a reference swing based on a predetermined condition;
   a reference swing characteristic information calculation section adapted to calculate a primary reference swing having reference swing characteristic information based on a plurality of the swing characteristic information from a plurality of the reference swings, and store the reference swing characteristic information of the primary reference swing in a storage section; and
   a comparison section adapted to compare the swing characteristic information calculated by the swing characteristic information calculation section with the reference swing characteristic information of the primary reference swing calculated by the reference swing characteristic information calculation section and to generate comparison information.

8. A swing analysis method comprising:
   (a) calculating swing characteristic information of a swing of sports equipment based on output data of a motion sensor adapted to detect the swing;
   (b) selecting the swing characteristic information of the swing as a reference swing based on a predetermined condition;
   (c) calculating reference swing characteristic information for a primary reference swing based on a plurality of the swing characteristic information from a plurality of the reference swing selected, storing the reference swing characteristic information of the primary reference swing in a storage section;
   (e) comparing the swing characteristic information calculated with the reference swing characteristic information of the primary reference swing;
   (f) generating a comparison information based on the comparison; and
   (g) outputting the comparison information.

* * * * *